US 12,295,528 B2

(12) United States Patent
Tarr

(10) Patent No.: US 12,295,528 B2
(45) Date of Patent: May 13, 2025

(54) COOLING FAN FOR A STAND MIXER

(71) Applicant: Haier US Appliance Solutions, Inc., Wilmington, DE (US)

(72) Inventor: Ronald Scott Tarr, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 660 days.

(21) Appl. No.: 17/670,588

(22) Filed: Feb. 14, 2022

(65) Prior Publication Data

US 2023/0255410 A1 Aug. 17, 2023

(51) Int. Cl.
*A47J 43/08* (2006.01)
*A47J 43/07* (2006.01)

(52) U.S. Cl.
CPC ......... *A47J 43/082* (2013.01); *A47J 43/0711* (2013.01); *A47J 43/0755* (2013.01); *A47J 2202/00* (2013.01)

(58) Field of Classification Search
CPC ... A47J 43/0711; A47J 43/082; A47J 43/0755
See application file for complete search history.

(56) References Cited

U.S. PATENT DOCUMENTS

| 2,185,155 | A | | 12/1939 | Meeker et al. |
| 5,244,275 | A | * | 9/1993 | Bauer ............. A47J 43/085 366/601 |
| 6,595,113 | B1 | * | 7/2003 | Chang .............. A47J 43/0716 366/205 |
| 7,614,779 | B2 | * | 11/2009 | Ta .................... A47J 43/044 366/98 |
| 10,773,227 | B2 | | 9/2020 | Kolar et al. |
| 2017/0273508 | A1 | * | 9/2017 | Kim ................. A47J 43/0716 |
| 2017/0296992 | A1 | * | 10/2017 | Kolar ............... A47J 43/046 |
| 2018/0014696 | A1 | | 1/2018 | Williams |
| 2018/0301900 | A1 | * | 10/2018 | Geng ................... H02J 3/14 |

FOREIGN PATENT DOCUMENTS

| CN | 205697402 U | 11/2016 |
| CN | 211432490 U | 9/2020 |

* cited by examiner

*Primary Examiner* — Elizabeth Insler
(74) *Attorney, Agent, or Firm* — Dority & Manning, P.A.

(57) ABSTRACT

A stand mixer includes a casing forming a base, a column extending from the base, and a motor housing connected to the column, the casing including an air inlet and an air outlet; a motor assembly provided within the motor housing, the motor assembly including a motor shaft; and a cooling fan provided adjacent to the air inlet, the cooling fan being rotatable about a fan shaft. The fan shaft is separate from the motor shaft and the cooling fan is operated independently from the motor assembly.

20 Claims, 2 Drawing Sheets

COOLING FAN FOR A STAND MIXER

FIELD OF THE INVENTION

The present subject matter relates generally to home appliances, and more particularly to kitchen appliances having cooling fans.

BACKGROUND OF THE INVENTION

Stand mixers are generally used for performing automated mixing, churning, or kneading involved in food preparation. Typically, stand mixers include a motor configured to provide torque to one or more driveshafts. Users may connect various utensils to the one or more driveshafts, including whisks, spatulas, or the like. In performing operations, the motor tends to produce excess heat, especially as the torque load is increased for high load, low speed applications. This heat production can lead to a degradation of motor performance and premature motor failure. Moreover, excessive heat production may overheat an exterior surface of the stand mixer, potentially leading to a perception of poor quality.

Some motors in stand mixers include a cooling fan attached to the motor driveshaft that provides a cooling flow of air over the motor as the motor is used. However, certain drawbacks exist to these designs, and further improvements are required. For one example, the cooling ability of the attached cooling fan is limited to a speed of the motor and is thus inefficient or ineffective at a low motor speed. For another example, the cooling fan may only be operated when the motor itself is operated, limited the cooling ability to only when the mixer is in use.

Accordingly, a stand mixer that obviates one or more of the above-mentioned drawbacks would be beneficial. Particularly, a stand mixer incorporating an independent cooling fan would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a stand mixer is provided. The stand mixer may include a casing including a base, a column extending from the base, and a motor housing connected to the column, the casing including an air inlet and an air outlet; a motor assembly provided within the motor housing, the motor assembly including a motor shaft; and a cooling fan provided adjacent to the air inlet, the cooling fan being rotatable about a fan shaft, wherein the fan shaft is separate from the motor shaft and wherein the cooling fan is operated independently from the motor assembly.

In another exemplary aspect of the present disclosure, a stand mixer is provided. The stand mixer may include a casing including a base, a column extending from the base, and a motor housing connected to the column, the casing including an air inlet defined in the base and an air outlet defined in the motor housing; a motor assembly provided within the motor housing, the motor assembly including a motor output shaft and a motor accessory shaft, the motor output shaft and the motor accessory shaft being perpendicular to each other; and a cooling fan provided within the base adjacent to the air inlet, the cooling fan being rotatable about a fan shaft, wherein the fan shaft is separate from the motor assembly and wherein the cooling fan is operated independently from the motor assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
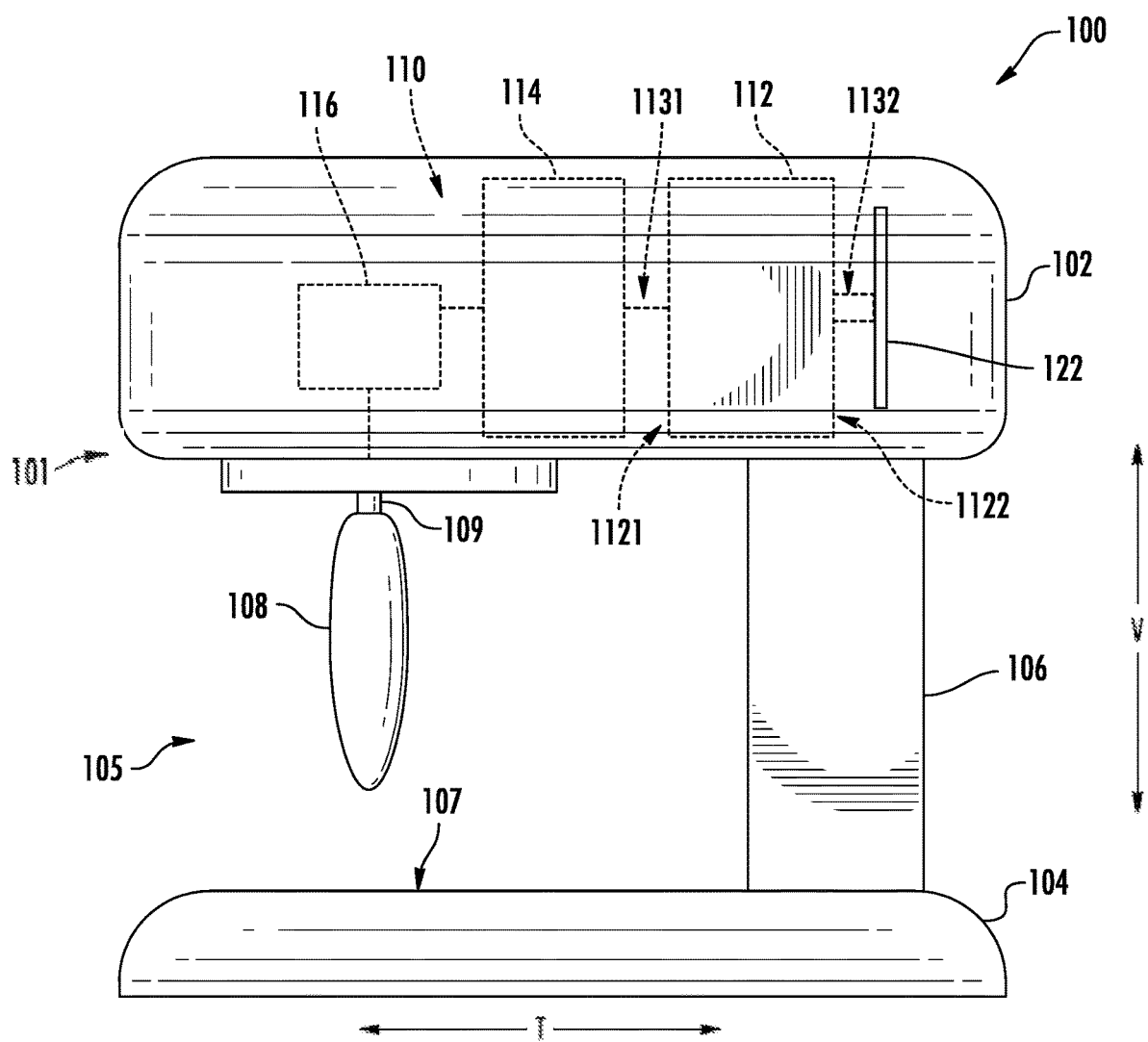
FIG. 1 provides a side section view of a stand mixer according to an exemplary embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a side, elevation view of a stand mixer 100 according to an exemplary embodiment of the present subject matter. It will be understood that stand mixer 100 is provided by way of example only and that the present subject matter may be used in or with any suitable stand mixer in alternative example embodiments. Moreover, with reference to each of FIGS. 1 and 2, stand mixer 100 defines a vertical direction V, a lateral direction L, and a transverse direction T. It should be understood that these directions are presented for exemplary purposes only, and that relative positions and locations of certain aspects of stand mixer 100 may vary according to specific embodiments, spatial placement, or the like.

Stand mixer 100 may include a casing 101. In detail, casing 101 may include a motor housing 102, a base 104, and a column 106. Motor housing 102 may house various mechanical and/or electrical components of stand mixer 100, which will be described in further detail below. For example, as shown in FIG. 1, a motor 112, a planetary gearbox (or reduction gearbox) 114, and a bevel gear box 116 may be disposed within motor housing 102. Base 104 may support motor housing 102. For example, motor housing 102 may be mounted (e.g., pivotally) to base 104 via column 106, e.g., that extends upwardly (e.g., along the vertical direction V). Motor housing 102 may be suspended over a mixing zone 105, within which a mixing bowl may be disposed.

A drivetrain 110 may be provided within motor housing 102 and is configured for coupling motor 112 to a shaft 109 (e.g., a mixer shaft), such that shaft 109 is rotatable via motor 112 through drivetrain 110. Drivetrain 110 may include planetary gearbox 114, bevel gearbox 116, etc. Mixer shaft 109 may be positioned above mixing zone 105 on motor housing 102, and an attachment 108, such as a beater, whisk, or hook, may be removably mounted to mixer shaft 109. Attachment 108 may rotate within a bowl (not shown) in mixing zone 105 to beat, whisk, knead, etc. material within the bowl, during operation of motor 112.

As noted above, motor 112 may be operable to rotate mixer shaft 109. Motor 112 may be a direct current (DC) motor in certain example embodiments. In alternative example embodiments, motor 112 may be an alternating current (AC) motor. Motor 112 may include a rotor and a stator. The stator may be mounted within motor housing 102 such that the stator is fixed relative to motor housing 102. A current through windings within the stator may generate a magnetic field that induces rotation of the rotor, e.g., due to magnets or a magnetic field via coils on the stator. The rotor may rotate at a relatively high rotational velocity and relatively low torque. Thus, drivetrain 110 may be configured to provide a rotational speed reduction and mechanical advantage between motor 112 and mixer shaft 109.

Figure 2:
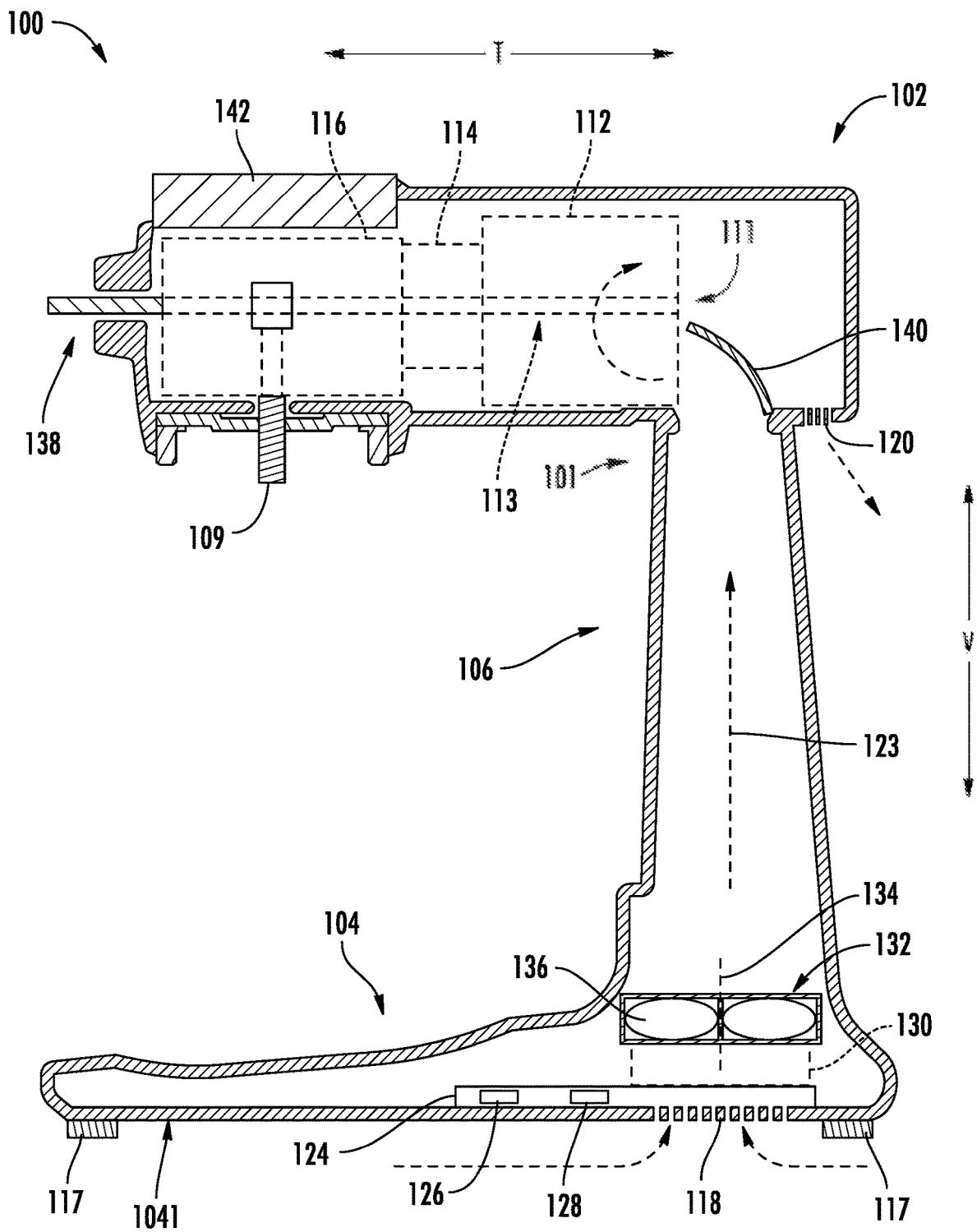
FIG. 2 provides a side section view of a stand mixer according to another exemplary embodiment of the present disclosure.

Referring now to FIG. 2, another exemplary embodiment of stand mixer 100 will be provided. Where appropriate, like reference numerals will refer to like features. Similar to the embodiment described above with reference to FIG. 1, stand mixer 100 may include casing 101 including base 104, column 106, and motor housing 102. For instance, base 104 may be provided at or near a lower portion of stand mixer 100. Base 104 may have a plurality of feet 117 attached thereto. For instance, the plurality of feet 117 may be attached to a bottom surface 1041 of base 104. Accordingly, bottom surface 1041 may be spaced apart from a surface on which stand mixer 100 rests. Column 106 may extend from base 104 (e.g., predominantly along the vertical direction V). In detail, column 106 extends upward from a rear of base 104 along the transverse direction T. Accordingly, motor housing 102 may be connected to column 106. For instance, motor housing 102 may pivot with respect to column 106.

A motor assembly 111 may be provided within motor housing 102. For instance, motor assembly 111 may include multiple components, such as motor 112, drivetrain 110, planetary gearbox 114, bevel gearbox 116, and the like. Motor 112 may be a bidirectional motor. In detail, motor 112 may be capable of providing rotational force in two separate directions (e.g., clockwise and counter-clockwise). Advantageously, stand mixer 100 may be capable of rotating attachment 108 (e.g., a mixing whisk, spatula, beater, etc.) in multiple directions, allowing for more thorough mixing and multiple mixing options.

A motor shaft 113 may be selectively rotated by motor 112. In detail, motor shaft 113 may protrude from motor 112 (e.g., along the transverse direction T). Motor shaft 113 may include a first portion 1131 and a second portion 1132 (FIG. 1). First portion 1131 may protrude from a first transverse end 1121 of motor 112 toward a front of stand mixer 100 (e.g., toward planetary gearbox 114). For instance, first portion 1131 may extend into planetary gearbox 114 and be mechanically engaged therewith. In some embodiments, first portion 1131 extends into planetary gearbox 114. An output from planetary gearbox 114 may transfer rotational energy into bevel gearbox 116 (e.g., via a separate shaft). Second portion 1132 may extend from a second transverse end 1122 of motor 112 (e.g., toward a rear of stand mixer 100). For instance, a motor fan 122 may be attached to second portion 1132 of motor shaft 113. According to this embodiment, when motor 112 is operated (e.g., motor shaft 113 is rotated), motor fan 122 is also rotated to provide a flow of cooling air over motor 112 (and optionally toward the front of motor housing 102 to provide cooling to planetary gearbox 114 and bevel gearbox 116).

Casing 101 may include an air inlet 118 and an air outlet 120. In detail, air inlet 118 may be defined in base 104. According to at least some embodiments, air inlet 118 is defined in bottom surface 1041 of base 104. Additionally or alternatively, air inlet 118 may be defined at or near a rear (e.g., along the transverse direction) of base 104. Advantageously, air inlet 118 is hidden from view from any users or observers of stand mixer 100, increasing aesthetic appeal. Moreover, because the plurality of feet 117 create a space between bottom surface 1041 of base 104 and a resting surface, air may easily enter casing 101 via air inlet 118. However, it should be understood that air inlet 118 may be defined at any suitable location on casing 101, including within column 106 and/or motor housing 102, and the disclosure is not limited to the examples given herein.

Air inlet 118 may be defined by a plurality of openings in base 104. In detail, the plurality of openings allows communication between an exterior of stand mixer 100 and an interior of casing 101 (e.g., base 104). The plurality of openings may extend, for example, along the lateral direction L or along the transverse direction T. However, it should be noted that a size, shape, and orientation of the plurality of openings may vary according to specific embodiments. In some embodiments, a screen may be provided over air inlet 118. Additionally or alternatively, air inlet 118 may include one or more louvers or adjustable slats to direct a flow or amount of intake air. As would be understood, air inlet 118 may incorporate one or more of the above-mentioned features.

Air outlet 120 may be defined in motor housing 102. In detail, air outlet 120 may be spaced apart from air inlet 118 (e.g., through casing 101). Accordingly, an air flow passage (denoted by arrows 123) is defined through casing 101. It should be noted that the direction of air travel as shown in FIG. 2 is by example only, and that any suitable air path may be defined, such as in an opposite direction. Additionally or alternatively, as shown in FIG. 2, air outlet 120 may be formed at or near a rear portion of motor housing 102 (e.g., along the transverse direction T). Specifically, air outlet 120 may be provided at or along a bottom of the rear of motor housing 102. Similar to air inlet 118, the specific location of air outlet 120 may vary according to specific embodiments so as to allow for easy and unobstructed and unintrusive exhausting of air from casing 101.

Air outlet 120 may be defined by a plurality of openings in motor housing 102. In detail, the plurality of openings allows communication between an exterior of stand mixer 100 and an interior of casing 101 (e.g., motor housing 102). The plurality of openings may extend, for example, along the lateral direction L or about the transverse direction T. However, it should be noted that a size, shape, and orientation of the plurality of openings may vary according to specific embodiments. In some embodiments, a screen may be provided over air outlet 120. Additionally or alternatively, air outlet 120 may include one or more louvers or adjustable slats to direct a flow of exhaust air. As would be understood, air outlet 120 may incorporate one or more of the above-mentioned features.

As shown in FIG. 2, the air flow path (123) may initiate at or near base 104. The air may continue up (e.g., along the vertical direction V) through column 106. The air may then enter motor housing 102. During an operation of stand mixer 100, the air may perform a heat exchange with various components within casing, such as motor assembly 111, and the like. Additionally or alternatively, other flow paths may be defined within casing 101, including multiple air inlets, multiple air outlets, or multiple locations of each of air inlets and air outlets.

Stand mixer 100 may include a control board 124 provided within casing 101. In detail, control board 124 may be located within base 104 of casing 101. For instance, control board 124 may be a controller, as would be understood, including one or more processing devices, memory devices, or controllers. Control board 124 may include a plurality of electrical components configured to permit operation of stand mixer 100 and various components therein (e.g., motor 112). For instance, control board 124 may be a printable circuit board (PCB), as would be well known. In particular, control board 124 may include a first power source 126 and a second power source 128. For purposes of this disclosure, first and second power sources 126 and 128 may refer to power relays or modules capable of transmitting and/or transforming electrical power to different components within stand mixer 100. Additionally or alternatively, a heat sink 130 may be attached to control board 124 (e.g., attached to heat generating components on control board 124). Heat sink 130 may include a plurality of fins configured to remove heat from, e.g., control board 124. Control board 124 may be positioned at or near air inlet 118.

As used herein, the terms "control board," "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, control board 124 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Control board 124 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, control board 124 may be operable to execute programming instructions or micro-control code associated with an operating cycle of stand mixer 100. In this regard, the instructions may be software or any set of instructions that when executed by the processing device, cause the processing device to perform operations, such as running one or more software applications, displaying a user interface (described below), receiving user input, processing user input, etc. Moreover, it should be noted that control board 124 as disclosed herein is capable of and may be operable to perform any methods, method steps, or portions of methods as disclosed herein. For example, in some embodiments, methods disclosed herein may be embodied in programming instructions stored in the memory and executed by control board 124. According to still other embodiments, user interface 142 may include one or more microprocessors and/or one or more memory devices. Accordingly, certain components of stand mixer 100 may be controlled directly from user interface 142.

The memory devices may also store data that can be retrieved, manipulated, created, or stored by the one or more processors or portions of control board 124. The data can include, for instance, data to facilitate performance of methods described herein. The data can be stored locally (e.g., on control board 124) in one or more databases and/or may be split up so that the data is stored in multiple locations. In addition, or alternatively, the one or more database(s) can be connected to controller 166 through any suitable network(s), such as through a high bandwidth local area network (LAN) or wide area network (WAN). In this regard, for example, control board 124 may further include a communication module or interface that may be used to communicate with one or more other component(s) of stand mixer 100, control board 124, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

In certain operations, components within stand mixer 100, including for instance control board 124, motor 112, and the like, may generate excessive heat which may potentially damage the components. Thus, as mentioned above, cooling processes which efficiently and effectively remove the heat would be beneficial. According to some embodiments, one or more cooling processes utilizing one or more fans may be incorporated within casing 101 to provide enhanced and improved cooling.

For instance, a cooling fan 132 may be provided adjacent to air inlet 118. In detail, cooling fan 132 may be positioned adjacent to control board 124 (e.g., at or near heat sink 130). Cooling fan 132 may operate to urge a flow of air (e.g., along air flow path 123) from air inlet 118 to air outlet 120. Cooling fan 132 may be any suitable type of air handler, for example. In at least some embodiments, cooling fan 132 is an axial fan including a fan shaft 134 and a plurality of blades 136 attached to fan shaft 134. However, it should be appreciated that according to alternative embodiments, cooling fan 132 may be positioned at any other suitable location and may be any other suitable fan type, such as a tangential fan, a centrifugal fan, etc. For instance, according to some embodiments, cooling fan 132 may be positioned within motor housing 102.

Fan shaft 134 may be oriented predominantly along the vertical direction V. For instance, fan shaft 134 may be parallel to the path of air (123) within column 106. Accordingly, air supplied to casing 101 via air inlet 118 may be easily urged upward through column 106 toward motor housing 102. Motor shaft 113 may be oriented predominantly along the transverse direction T. Thus, fan shaft 134 may be predominantly perpendicular to motor shaft 113. Additionally or alternatively, motor shaft 113 is provided separately from fan shaft 134. Thus, fan shaft 134 may rotate independently from motor shaft 113.

Cooling fan 132 may be a multispeed fan. For instance, cooling fan 132 may be configured to operate (e.g., rotate) at a plurality of speeds (e.g., high, medium, low, pulsing, etc.). The speed at which cooling fan 132 rotates may be selected by a user, or may be selected automatically by stand mixer 100 (e.g., control board 124). In some instances, the speed at which cooling fan 132 rotates may be modulated. The modulated rotational speed may be decided according to an input setting. Advantageously, cooling fan 132 may be operated efficiently, quietly, and effectively. Additionally or alternatively, multiple cooling fans 132 may be included. For one example, two cooling fans 132 may be provided. The multiple cooling fans 132 may be provided in series or in parallel, as specific embodiments require.

Accordingly, cooling fan 132 is provided separately from motor 112. Indeed, cooling fan 132 may be separated from motor 112 by column 106. Advantageously, an operation of cooling fan 132 may be performed independently from an operation of motor 112. For instance, motor 112 may be connected to, and powered by, first power source 126 on control board 124. Cooling fan 132 may thus be connected to, and powered by, second power source 128. Since first power source 126 and second power source 128 are separately controlled (e.g., by control board 124), motor 112 is controlled and operated separately from cooling fan 132. For instance, if motor 112 is performing a high torque, slow rotation operation, motor 112 may produce an abundance of heat. Because cooling fan 132 is controlled separately, cooling fan 132 may be rotated at a higher speed (e.g., a max speed) to increase a flow of cooling air over motor 112. Advantageously, a more effective cooling pattern may be performed over motor 112 (and indeed the entire drivetrain 110).

Moreover, cooling fan 132 may operate when motor 112 is off completely. In detail, after performing one or more intensive actions, motor may retain high amounts of heat after ceasing operation. Control board 124 may continue to supply power to cooling fan 132 after motor 112 has stopped operating. Thus, a continued flow of cooling air is supplied to motor 112 (and drivetrain 110) after completion of operations, further cooling heated components and allowing stand mixer 100 to be quickly operated again in a safe manner.

Additionally or alternatively, stand mixer 100 may include an auxiliary shaft 138. For instance, auxiliary motor shaft 138 may protrude from a front of motor housing 102. In at least some embodiments, auxiliary shaft 138 is perpendicular (or predominantly perpendicular) to mixer shaft 109. Auxiliary shaft 138 may be mechanically coupled to bevel gearbox 116, for instance. In some procedures, a user may utilize auxiliary shaft 138 using a high torque operation of motor 112, generating increased heat in motor housing 102. Control board 124 may thus operate cooling fan 132 at a high speed (both during and after operation of motor 112 to auxiliary shaft 138) to provide fast cooling of motor 112. Thus, advantageously, the user can use stand mixer 100 quickly in a different procedure, e.g., utilizing mixer shaft 109.

As described above, cooling fan 132 may be provided in base 104 and motor 112 may be provided in motor housing 102. Likewise, air inlet 118 may be provided in base 104 and air outlet 120 may be provided in motor housing 102. Accordingly, cooling fan 132 may urge air from air inlet 118, over control board 124 (and heat sink 130), up through column 106, into motor housing 102, over motor 112 (and drivetrain 110) and out air outlet 120. The air flow pattern (123) may thus be under a positive pressure within casing 101. Advantageously, excess air pressure within casing 101 may restrict or limit foreign particles (e.g., dust, flour, etc.) from entering casing 101, preventing damage to components within stand mixer 100.

An air deflector 140 may be provided within casing 101. In detail, air deflector 140 may be located within motor housing 102. As shown particularly in FIG. 2, air deflector 140 may assist in urging the flow of air (123) toward the front of motor housing 102. Thus, cooling air may be more efficiently supplied to drivetrain 110, including planetary gearbox 114 and bevel gearbox 116. Air deflector 140 may thus extend from a junction of column 106 and motor housing 102 (e.g., near a rear of casing 101). Air deflector 140 may be curved such that a convex portion of air deflector 140 faces a top rear of motor housing 102. Accordingly, air deflector 140 may extend along the vertical direction V and along the transverse direction T. Additionally or alternatively, air deflector 140 may extend along the lateral direction L within motor housing 102. For instance, air deflector may extend to deflect air over an area about 50% to about 80% of a cross-sectional area of motor housing along the lateral direction L.

In some embodiments, air deflector 140 may be curved about the vertical direction V and the lateral direction L. In detail, air deflector 140 may create a vortex of the air flow (123) through motor housing 102. Advantageously, air may flow in a circular or vortex pattern through motor housing 102, increasing a cooling effect generated along motor 112, planetary gearbox 114, and bevel gearbox 116. It should be understood that air deflector 140 may have any suitable shape, and the disclosure is not limited to those listed and described herein. For instance, air deflector 140 may extend beyond motor 112 (e.g., toward planetary gearbox 114).

A user interface 142 may be provided on stand mixer 100. In detail, user interface 142 may be provided on an exterior surface of motor housing 102. User interface 142 may be electrically connected with control board 124. Thus, user interface 142 may facilitate an operation of motor 112, cooling fan 132, and the like. User interface 142 may include one or more controls, such as knobs, switches, buttons, toggles, or the like. In some embodiments, user interface 142 incorporates a touch screen or liquid crystal display (LCD) facilitating user interaction with stand mixer 100. Additionally or alternatively, user interface 142 may include a wireless connection module, allowing wireless communication with one or more external devices, such as mobile phones, tablets, personal computers, or the like. Accordingly, stand mixer 100 may be controlled externally by a mobile device. Moreover, certain information regarding operation of stand mixer 100 may be communicated to remote users via the wireless connection module.

According to the embodiments, disclosed herein, a stand mixer may include a motor driving a motor shaft, and a separate cooling fan provided spaced apart from the motor and driven by a separate fan shaft. An axial direction of the motor shaft may be different from an axial direction of the fan shaft. The motor may be controlled separately from the cooling fan. For instance, the cooling fan may be operated at different speeds from the motor and at different times from the motor. The cooling fan may be a multispeed fan capable of rotating at a plurality of rotational speeds. Advantageously, the motor may be more efficiently, effectively, and thoroughly cooled by the separate cooling fan.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stand mixer defining a vertical direction, a lateral direction, and a transverse direction, the stand mixer comprising:
    a casing comprising a base, a column extending from the base, and a motor housing pivotally connected to a top of the column, the column defining an air flow path between the base and the motor housing, the casing defining an air inlet through the base and an air outlet through the motor housing;
    a motor assembly provided within the motor housing, the motor assembly comprising a motor shaft; and
    a cooling fan provided within the base, the cooling fan being rotatable about a fan shaft, wherein the fan shaft is separate from the motor shaft and wherein the cooling fan is operated independently from the motor assembly,
    wherein the cooling fan is operable to urge a flow of air along the air flow path from the air inlet to the air outlet.

2. The stand mixer of claim 1, wherein the cooling fan is provided adjacent the air inlet upstream from the motor assembly along the vertical direction.

3. The stand mixer of claim 2, wherein the cooling fan is an axial fan orientated along the vertical direction such that the fan shaft is perpendicular to the motor shaft.

4. The stand mixer of claim 1, further comprising a control board provided within the casing, wherein the motor assembly is connected to a first power source on the control board and the cooling fan is connected to a second power source on the control board.

5. The stand mixer of claim 1, wherein the motor assembly further comprises:
    a bi-directional motor; and
    a reduction gearbox in mechanical communication with the bi-directional motor, wherein the motor shaft comprises a first portion that extends from a first transverse end of the bi-directional motor into the reduction gearbox, and a second portion that extends from a second transverse end of the bi-directional motor opposite the first transverse end.

6. The stand mixer of claim 5, further comprising:
    a motor fan attached to the second portion of the motor shaft.

7. The stand mixer of claim 1, wherein the air inlet is provided on a bottom of the base adjacent to the cooling fan, and wherein the air outlet is provided at a rear of the motor housing.

8. The stand mixer of claim 7, wherein the air outlet is provided along a bottom of the motor housing.

9. The stand mixer of claim 1, further comprising:
    an air deflector provided within the motor housing, wherein the air deflector is configured to direct airflow from the cooling fan across the motor.

10. The stand mixer of claim 9, wherein the air deflector is attached to an interior surface of the motor housing at a rear of the motor housing and extends along the vertical and transverse directions toward a center of the motor housing.

11. The stand mixer of claim 1, wherein the cooling fan is a multispeed fan configured to rotate at multiple rotational speeds.

12. A stand mixer defining a vertical direction, a lateral direction, and a transverse direction, the stand mixer comprising:
    a casing comprising a base, a column extending from the base, and a motor housing pivotally connected to a top of the column, the column defining an airflow path between the base and the motor housing, the casing defining an air inlet through the base and an air outlet through the motor housing;
    a motor assembly provided within the motor housing, the motor assembly comprising a motor output shaft and a motor accessory shaft, the motor output shaft and the motor accessory shaft being perpendicular to each other; and
    a cooling fan provided within the base adjacent to the air inlet, the cooling fan being rotatable about a fan shaft, wherein the fan shaft is separate from the motor assembly and wherein the cooling fan is operated independently from the motor assembly,
    wherein the cooling fan is operable to urge a flow of air along the air flow path from the air inlet to the air outlet.

13. The stand mixer of claim 12, wherein the cooling fan is provided below the motor assembly along the vertical direction.

14. The stand mixer of claim 13, wherein the fan shaft is perpendicular to the motor output shaft.

15. The stand mixer of claim 12, further comprising a control board provided within the casing, wherein the motor assembly is connected to a first power source on the control board and the cooling fan is connected to a second power source on the control board.

16. The stand mixer of claim 12, wherein the motor assembly further comprises:
    a bi-directional motor;
    a motor shaft extending from the bi-directional motor and configured to be rotated by the motor; and
    a reduction gearbox in mechanical communication with the bi-directional motor, wherein the motor shaft comprises a first portion that extends from a first transverse end of the bi-directional motor into the reduction gearbox, and a second portion that extends from a second transverse end of the bi-directional motor opposite the first transverse end.

17. The stand mixer of claim 12, wherein the air inlet is provided on a bottom of the base adjacent to the cooling fan, and wherein the air outlet is provided at a rear of the motor housing.

18. The stand mixer of claim 17, wherein the air outlet is provided along a bottom of the motor housing.

19. The stand mixer of claim 12, further comprising:
    an air deflector provided within the motor housing, wherein the air deflector is configured to direct airflow from the cooling fan across the motor.

20. The stand mixer of claim 19, wherein the air deflector is attached to an interior surface of the motor housing at a rear of the motor housing and extends along the vertical and transverse directions toward a center of the motor housing.

* * * * *